United States Patent
Kakeya et al.

(10) Patent No.: US 9,419,273 B2
(45) Date of Patent: Aug. 16, 2016

(54) ALKALINE STORAGE BATTERY, POSITIVE ELECTRODE MATERIAL FOR ALKALINE STORAGE BATTERY, AND METHOD FOR MANUFACTURING POSITIVE ELECTRODE MATERIAL FOR ALKALINE STORAGE BATTERY

(71) Applicant: GS Yuasa International Ltd., Kyoto-shi, Kyoto (JP)

(72) Inventors: Tadashi Kakeya, Kyoto (JP); Hideto Watanabe, Kyoto (JP); Manabu Kanemoto, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 347 days.

(21) Appl. No.: 14/037,604

(22) Filed: Sep. 26, 2013

(65) Prior Publication Data

US 2014/0093777 A1   Apr. 3, 2014

(30) Foreign Application Priority Data

Sep. 28, 2012   (JP) ................. 2012-217324
Sep. 20, 2013   (JP) ................. 2013-195295

(51) Int. Cl.
*H01M 2/00*   (2006.01)
*H01M 4/36*   (2006.01)
(Continued)

(52) U.S. Cl.
CPC .............. *H01M 4/364* (2013.01); *C01G 53/04* (2013.01); *H01M 4/32* (2013.01); *H01M 4/52* (2013.01);
(Continued)

(58) Field of Classification Search
CPC .......... H01M 4/364; H01M 4/32; H01M 4/52

USPC ........................................ 429/223; 252/182.1
See application file for complete search history.

(56) References Cited

U.S. PATENT DOCUMENTS 4,985,318 A    1/1991   Oshitani et al.
RE34,752 E    10/1994   Oshitani et al.
(Continued)

FOREIGN PATENT DOCUMENTS

CN   101054205   10/2007
CN   101391798    3/2009
(Continued)

OTHER PUBLICATIONS

Masahiko Oshitani et al. "Effect of Lanthanide Oxide Additives on the High-Temperature Charge Acceptance Characteristics of Pasted Nickel Electrodes." Journal of the Electrochemical Society, 148(1) A67-A73 (2001); English text.
(Continued)

*Primary Examiner* — Mark F Huff
*Assistant Examiner* — Monique Wills
(74) *Attorney, Agent, or Firm* — Rankin, Hill & Clark LLP (57) ABSTRACT

A positive electrode material for an alkaline storage battery includes nickel hydroxide. Zn and an A element are held in solid solution in a crystallite of the nickel hydroxide, the A element being at least one element selected from the group consisting of Al, Ga, Mn, and Mo. The content of the A element, [A]/([Ni]+[A]+[Zn]), is 5 to 16% (where [A] represents the molarity of the A element, [Ni] represents the molarity of nickel, and [Zn] represents the molarity of zinc in the crystallite). [Zn]/([Ni]+[A]+[Zn]) is 1 to 10%. The nickel hydroxide includes α-phase nickel hydroxide and β-phase nickel hydroxide.

5 Claims, 3 Drawing Sheets

(51) Int. Cl.
*C01G 53/04* (2006.01)
*H01M 4/32* (2006.01)
*H01M 4/52* (2010.01)
H01M 10/30 (2006.01)
H01M 10/34 (2006.01)

(52) U.S. Cl.
CPC ......... *C01P 2002/50* (2013.01); *C01P 2002/52* (2013.01); *C01P 2006/11* (2013.01); *H01M 10/30* (2013.01); *H01M 10/345* (2013.01); *Y02E 60/124* (2013.01); *Y02P 70/54* (2015.11)

(56) References Cited

U.S. PATENT DOCUMENTS

| | | | |
|---|---|---|---|
| 5,672,447 | A | 9/1997 | Yamawaki et al. |
| 5,674,643 | A | 10/1997 | Yano et al. |
| 5,688,616 | A | 11/1997 | Yamawaki et al. |
| 5,700,596 | A | 12/1997 | Ikoma et al. |
| 5,773,169 | A | 6/1998 | Matsuda et al. |
| 6,013,390 | A | 1/2000 | Kimiya et al. |
| 6,086,843 | A | 7/2000 | Ovshinsky et al. |
| 6,129,902 | A | 10/2000 | Sakamoto et al. |
| 6,177,213 | B1 | 1/2001 | Fetcenko et al. |
| 6,228,535 | B1 | 5/2001 | Fetcenko et al. |
| 6,235,428 | B1 | 5/2001 | Yano et al. |
| 6,284,215 | B1 | 9/2001 | Sakamoto et al. |
| 6,348,285 | B2 | 2/2002 | Fetcenko et al. |
| 6,416,903 | B1 | 7/2002 | Fierro et al. |
| 6,432,580 | B1 | 8/2002 | Fierro et al. |
| 6,444,363 | B1 | 9/2002 | Benet et al. |
| 6,447,953 | B1 | 9/2002 | Fierro et al. |
| 6,548,209 | B2 | 4/2003 | Fetcenko et al. |
| 6,566,008 | B2 | 5/2003 | Yano et al. |
| 6,569,566 | B2 | 5/2003 | Fetcenko et al. |
| 6,632,568 | B1 | 10/2003 | Yamawaki et al. |
| 7,294,434 | B2 | 11/2007 | Fierro et al. |
| 8,057,934 | B2 | 11/2011 | Miiyamoto et al. |
| 2007/0212612 | A1* | 9/2007 | Kato ............... C01G 53/00 429/232 |

FOREIGN PATENT DOCUMENTS

| | | |
|---|---|---|
| EP | 0353837 | 2/1990 |
| EP | 0523284 | 1/1993 |
| EP | 0757395 | 2/1997 |
| JP | 8-222216 | 8/1996 |
| JP | 8-236110 | 9/1996 |
| JP | 9-237630 | 9/1997 |
| JP | 9-306487 | 11/1997 |
| JP | 10-284113 | 10/1998 |
| JP | 11-67199 | 3/1999 |
| JP | 2001-322817 | 11/2001 |
| JP | 2002-164047 | 6/2002 |
| JP | 2004-504698 | 2/2004 |
| JP | 2004-273138 | 9/2004 |
| JP | 2007-335154 | 12/2007 |
| JP | 2010-111522 | 5/2010 |
| WO | 2006/064979 | 6/2006 |

OTHER PUBLICATIONS

Extended European Search Report dated Jan. 22, 2014 filed in corresponding European patent application No. 13185989.4.

communication from European Patent Office dated Feb. 19, 2016 issued in the corresponding European patent application No. 13185989.4.

\* cited by examiner

ALKALINE STORAGE BATTERY, POSITIVE ELECTRODE MATERIAL FOR ALKALINE STORAGE BATTERY, AND METHOD FOR MANUFACTURING POSITIVE ELECTRODE MATERIAL FOR ALKALINE STORAGE BATTERY

CROSS-REFERENCE TO RELATED APPLICATION

This application is based on Japanese Patent Applications Nos. 2012-217324 and 2013-195295 filed with the Japan Patent Office on Sep. 28, 2012 and Sep. 20, 2013, respectively, the entire contents of which are hereby incorporated by reference.

FIELD

The present invention relates to an alkaline storage battery, a positive electrode material for the same, and a method for manufacturing the positive electrode material.

BACKGROUND

The use of $\alpha$-Ni(OH)$_2$ ($\alpha$-phase nickel hydroxide) as a positive active material has been investigated in order to increase the number of reaction electrons and the discharge capacity of an alkaline storage battery such as a nickel-metal hydride rechargeable battery or nickel-cadmium rechargeable battery. For stabilizing $\alpha$-Ni(OH)$_2$ in an alkaline medium, preparing Al in solid solution in an amount corresponding to 5 to 20 mol % of a Ni element in the medium has been suggested (see, for example, JP-A-2010-111522). In this case, the atomic ratio of Ni:Al is in the range of 95:5 to 80:20. Moreover, since the conductivity of Ni(OH)$_2$ of the positive active material is low, a surface of a Ni(OH)$_2$ particle is covered with CoOOH microparticles (see, for example, WO2006/064979A1). JP-A-2007-335154 discloses that an element such as Zn or Ca is dissolved in solid solution in nickel hydroxide, but does not disclose the operation of Zn and Ca in the positive electrode material. Further, this document describes neither the phase of Ni(OH)$_2$, nor Al or the like in solid solution. Therefore, the technique of this document may be based on the use of $\beta$-Ni(OH)$_2$.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to increase the number of reaction electrons of the positive active material and to increase the discharge capacity per volume of the positive electrode material.

A positive electrode material for an alkaline storage battery according to an aspect of the present invention includes nickel hydroxide. Zn and an A element are held in solid solution in a crystallite of the nickel hydroxide, the A element being at least one element selected from the group consisting of Al, Ga, Mn, and Mo. The content of the A element, [A]/([Ni]+[A]+[Zn]), is 5 to 16% (where [A] represents the molarity of the A element, [Ni] represents the molarity of nickel, and [Zn] represents the molarity of zinc in the crystallite). [Zn]/([Ni]+[A]+[Zn]) is 1 to 10%. The nickel hydroxide includes $\alpha$-phase nickel hydroxide and $\beta$-phase nickel hydroxide.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

A positive electrode material for an alkaline storage battery according to an aspect of the present invention includes nickel hydroxide. Zn and an A element are held in solid solution in a crystallite of the nickel hydroxide, the A element being at least one element selected from the group consisting of Al, Ga, Mn, and Mo. The content of the A element, [A]/([Ni]+[A]+[Zn]), is 5 to 16% (where [A] represents the molarity of the A element, [Ni] represents the molarity of nickel, and [Zn] represents the molarity of zinc in the crystallite). [Zn]/([Ni]+[A]+[Zn]) is 1 to 10%. The nickel hydroxide includes $\alpha$-phase nickel hydroxide and $\beta$-phase nickel hydroxide.

An alkaline storage battery according to an embodiment of the present invention includes a positive electrode, a negative electrode, and an alkaline electrolyte solution. The positive electrode includes a positive electrode material and a substrate. The positive electrode material contains nickel hydroxide, and the crystallite of this nickel hydroxide includes Zn and at least one element (A element) selected from the group consisting of Al, Ga, Mn and Mo in solid solution. The description related to the positive electrode material in this specification exactly applies to the alkaline storage battery. The following description is therefore related to both the positive electrode material and the alkaline storage battery.

Any of Al, Ga, Mn, and Mo, which cm be the A element, has been substituted for a part of the nickel atoms in the crystallite of the nickel hydroxide or exists between layers of the crystalline of the nickel hydroxide. The A element held in solid solution in the crystallite of the nickel hydroxide includes the substitution of the A element with some of the nickel atoms and the interposition of the A element between the layers. When the A element is held in solid solution in the crystallite of the nickel hydroxide, $\alpha$-nickel hydroxide is stabilized. It is known that the $\alpha$-phase is present as a single phase generally when any of these elements is held in solid solution by approximately 20 mol % relative to Ni. If the solubility of the element is less than 20 mol %, a mixed-phase state including $\alpha$-phase and $\beta$-phase is caused. In the present application, the mixed-phase state refers to a state in which $\alpha$-phase and $\beta$-phase are present in a mixed state within one primary particle. In the $\beta$-phase, generally, the number of electrons reacting in a process of charging and discharging is 1. Meanwhile, in the $\alpha$-phase, it is reported that the number of reaction electrons is greater than or equal to 1. When Zn is further held in solid solution in the nickel hydroxide in which Al or the like has been held in solid solution, an oxygen generation potential is increased. Thus, nickel hydroxide can be sufficiently oxidized at the time of charging. As a result, the number of Ni reaction electrons is increased. Therefore, a high-capacity positive electrode material and a high-capacity alkaline storage battery can be provided.

In the nickel hydroxide in which Zn is held in solid solution, the number of reaction electrons is increased if the solid solubility of the at least one element (A element) selected from the group consisting of Al, Ga, Mn, and Mo is 5 mol % or more. If the solid solubility of A element is 9 mol % or more, the number of reaction electrons is further increased. On the other hand, if the solid solubility of A element is 20 mol %, the number of reaction electrons is decreased. When the solid solubility of A element is further increased, the tap density of the nickel hydroxide is decreased. Thus, the solid solubility of A element is preferably 5 mol % or more, more preferably 9 mol % or more. Further, the solid solubility of A element is preferably 16 mol % or less, more preferably 12 mol % or less. In other words, the solid solubility of A element is preferably in the range of 5 to 16 mol %, more preferably 9 to 15 mol %, and particularly more 9 to 12 mol %. When the solid solubility of Zn in the positive electrode material is increased, the number of reaction electrons is increased. Therefore, the solid solubility of Zn is preferably in the range of 1 to 10 mol %, more preferably 2 to 8 mol %, and particularly preferably 3 to 7 mol %. The at least one element (A element) selected from the group consisting of Al, Ga, Mn, and Mo is preferably Al.

In an aspect of the present invention, [A]/([Ni]+[A]+[Zn]) may be 5 to 16%, and [Zn]/([Ni]+[A]+[Zn]) may be 1 to 10%, and it is preferred that [A]/([Ni]+[A]+[Zn]) is 9 to 15% and [Zn]/([Ni]+[A]+[Zn]) be 2 to 8%. It is more preferred that [A]/([Ni]+[A]+[Zn]) be 9 to 15% and [Zn]/([Ni]+[A]+[Zn]) be 3 to 7%. It is the most preferred that [A]/([Ni]+[A]+[Zn]) be 9 to 12% and [Zn]/([Ni]+[A]+[Zn]) is 3 to 7%. Here, [A] represents the molarity of the at least one element (A element) selected from the group consisting of Al, Ga, Mn, and Mo, [Ni] represents the molarity of nickel, and [Zn] represents the molarity of zinc.

Preferably, the crystallite of the nickel hydroxide further includes Co in solid solution. The solid solubility of cobalt in the nickel hydroxide particles is preferably 2 to 6 mol %. Here, the solubility of zinc may be, for example, 1 to 10 mol %, and is preferably 2 to 8 mol % and particularly preferably 3 to 7 mol %. The solid solubility of at least one element (A element) selected from the group consisting of Al, Ga, Mn, and Mo may be, for example, 5 to 16 mol %, and is preferably 9 to 15 mol % and particularly preferably 9 to 12 mol %. Hence, Co may promote the oxidation of Ni rather than the generation of oxygen by decreasing the Ni oxidation potential.

A method for manufacturing a positive electrode material for an alkaline storage battery according to an aspect of the present invention includes: causing a reaction between an aqueous solution containing $Ni^{2+}$ ion, at least one ion selected from the group consisting of $Al^{3+}$, $Ga^{3+}$, $Mn^{2+}$, and $Mo^{6+}$, and a $Zn^{2+}$ ion and an alkaline aqueous solution; coprecipitating the $Ni^{2+}$ ion, the at least one ion selected from the group consisting of $Al^{3+}$, $Ga^{3+}$, $Mn^{2+}$, and $Mo^{6+}$, and the $Zn^{2+}$ ion; and dissolving Zn and at least one element selected from the group consisting of Al, Ga, Mn, and Mo in solid solution in a crystallite of nickel hydroxide. Zn is preferably held in solid solution in the crystallite of the nickel hydroxide. The adhesion of the $Zn(OH)_2$ particle on the surface of the nickel hydroxide particle did not lead to an increase in number of reaction electrons. Further, the incorporation of the $Zn^{2+}$ ion in the electrolyte solution did not lead to an increase in number of reaction electrons.

Examples of the present invention are hereinafter described. In the implementation of the present invention, the example can be modified as appropriate in accordance with the common sense of a person skilled in the art and the disclosure of the prior art.

EXAMPLE

Preparation of Nickel Hydroxide

A mixture aqueous solution containing a hydrate of $NiSO_4$, a hydrate of $Al_2(SO_4)_3$, and a hydrate of $ZnSO_4$ was prepared so that the sum of the $Ni^{2+}$ ion concentration and the $Al^{3+}$ ion concentration became 1 mol/L. While this mixture aqueous solution was intensively stirred, this mixture aqueous solution was dripped into $(NH_4)_2SO_4$ aqueous solution. This $(NH_4)_2SO_4$ aqueous solution had a temperature of 45° C. and a pH of 11 (the pH was adjusted to 11 with NaOH aqueous solution). This caused coprecipitation of $Ni(OH)_2$, $Al(OH)_3$, and $Zn(OH)_2$. The $Al(OH)_3$ particles and the $Zn(OH)_2$ particles do not precipitate on a surface of the $Ni(OH)_2$ particles substantially. Instead, Al of the $Al(OH)_3$ particles and Zn of the $Zn(OH)_2$ particles are taken into the $Ni(OH)_2$ particles and at least a part thereof is substituted for Ni. For example, in this specification, "3 mol % substitution of Al" refers to that the aluminum concentration relative to the total concentration of Al and Ni in the nickel hydroxide particles is 3 mol %. In the coprecipitation reaction, almost all of the Ni, Al, and Zn are precipitated. Thus, [Al]/([Ni]+[Al]+[Zn]) and [Zn]/([Ni]+[Al]+[Zn]) in the positive electrode material can be controlled by the ratio of the preparation amount among $NiSO_4$, $Al_2(SO_4)_3$, and $ZnSO_4$. [Al] represents the molarity of Al, [Ni] represents the molarity of nickel, and [Zn] represents the molarity of zinc.

When just the coprecipitation of $Ni(OH)_2$, $Al(OH)_3$, and $Zn(OH)_2$ is necessary, the pH may be determined in the range of allowing the separation of those. For increasing the tap density of the positive electrode material (the volume density of the positive electrode material after the tapping), the pH is preferably 10 or more and 12 or less, and particularly preferably 10.5 or more and 11.5 or less. Instead of $NiSO_4$, any water-soluble Ni salt may be used. Instead of $Al_2(SO_4)_3$ and $ZnSO_4$, any water-soluble aluminum salt or zinc salt may be used. Before the coprecipitation of $Ni(OH)_2$, $Al(OH)_3$, and $Zn(OH)_2$, the $Ni^{2+}$ ion may be changed into an amine complex of the $Ni^{2+}$ ion and the $Zn^{2+}$ ion may be changed into an amine complex of the $Zn^{2+}$ ion.

The precipitate obtained by filtering was subjected to water washing and drying. Thus, nickel hydroxide was obtained. In this crystallite of the nickel hydroxide, Al and Zn are held in solid solution. Then, a Co compound such as $\alpha$-$Co(OH)_2$ was mixed into the nickel hydroxide. A positive electrode paste was obtained by mixing a carboxyl methylcellulose (CMC) aqueous solution of 1 mass % concentration and polytetrafluoroethylene (PTFE) into a mixture of the nickel hydroxide and the Co compound. As for the composition ratio of the positive electrode paste, for example, nickel hydroxide:$\alpha$-Co$(OH)_2$:PTFE+CMC=89.5:10:0.5.

A foamed nickel substrate with a thickness of 1.4 mm and a density of 320 g/m$^2$ per unit area was filled with the positive electrode paste so that the electrode capacity became 250 mAh. After the positive electrode paste was dried, the substrate was rolled. Thus, a sheet of the nickel electrode with a thickness of 0.4 mm was obtained. By cutting this sheet into a size of 40 mm×60 mm, the nickel electrode (positive electrode) of the alkaline storage battery was obtained.

For obtaining the alloy with a composition of $Mm_{1.0}Ni_{4.0}Co_{0.7}Al_{0.3}Mn_{0.3}$ (Mm represents Mischmetal), the raw materials were mixed and a high-frequency inductive heating was carried out in an inert atmosphere. Thus, an alloy ingot was fabricated. The alloy ingot was heated at 1000° C. and then, pulverized so that the resulting particles in powder could have a mean particle size of 50 μm. Thus, hydrogen storage alloy powder was obtained. This powder was mixed with a dispersion liquid of SBR (styrene butadiene rubber) and a methyl cellulose (MC) aqueous solution. Thus, a hydrogen storage alloy paste was obtained. This paste was applied and dried on a Fe substrate with a thickness of 45 μm plated with 1-μm-thick Ni, thereby providing a hydrogen storage alloy electrode sheet. This sheet was cut into a size of 45 mm×65 mm. Thus, a hydrogen storage alloy electrode (negative electrode) with an electrode capacity of 500 mAh or more was obtained.

A separator made of synthetic resin was disposed on each side of the nickel electrode. This was sandwiched between two hydrogen storage alloy electrodes and set in a container. As a reference electrode, an Hg/HgO electrode was provided. An alkaline electrolyte solution containing 6.8 mol/L of KOH was poured until the electrode was sufficiently immersed. Thus, an open type cell was obtained. After the $\alpha$-$Co(OH)_2$ particle in the nickel electrode was dissolved in the electrolyte solution, the particle might be precipitated again on the surface of the nickel hydroxide. The cell was initially charged for 15 hours at a current of 2 mA (0.1 ItA). It is assumed that during the initial charging, $\alpha$-$Co(OH)_2$ is oxidized into an oxyhydroxide of Co. In this manner, the alkaline storage battery and the nickel hydroxide as the positive electrode material thereof according to Example were fabricated.

After the initial charging, the alkaline storage battery was left stand for an hour. After that, the alkaline storage battery was discharged at 0.2 ItA (50 mA) until the positive electrode potential became equal to the potential of the reference electrode. Next, the alkaline storage battery was charged for 15 hours at a current of 0.1 ItA (25 mA). After the battery was left stand for an hour, the alkaline storage battery was discharged at 0.2 ItA (50 mA) until the positive electrode potential became equal to the potential of the reference electrode. This charge-standing-discharge cycle was repeated five times for each battery at an ambient temperature of 20° C. From the discharge capacity of the fifth cycle, the number of reaction electrons per nickel atom was measured. From the charging curve of the fifth cycle, the oxygen generation potential was measured.

During the coprecipitation of the nickel hydroxide, a $Co^{2+}$ ion was coprecipitated in addition to the $Al^{3+}$ ion and the $Zn^{2+}$ ion. Thus, the nickel hydroxide in which Co was further held in solid solution was fabricated.

A method of causing the Co hydroxide to be contained in the positive electrode material by a powder mixing method preferably includes, when the method is employed in the industrial application, a step of coating the surface of the Ni hydroxide particle with the Co hydroxide through dissolving into the electrolyte solution and re-separation, and a step of oxidizing the Co hydroxide into a Co oxyhydroxide or the like. Furthermore, as disclosed in WO2006/064979, this method preferably includes coating the surface of the nickel hydroxide particle with cobalt hydroxide in advance and oxidizing the cobalt hydroxide into the cobalt oxyhydroxide.

Definition and Measurement Method

"The composition of the positive electrode material" in this specification refers to the composition of the solid part of the positive electrode material, which excludes the substrate, after being extracted from the nickel electrode (positive electrode) and water-washed and dried. Ni is present as the hydroxide in the discharged state and as the oxyhydroxide in the charged state. The mass ratio between the both is 91.7: 92.7, which is almost 1:1.

The composition of the positive electrode material can be obtained from, for example, ICP analysis. Hence, Al and Zn may be substituted for the nickel atom by being held in solid solution in the crystallite of the nickel hydroxide or that Al and Zn are held in solid solution between the layers of the nickel hydroxide. Note that a part of Al and Zn may be precipitated as the hydroxide or the like. The nickel hydroxide was subjected to X-ray diffraction. As a result, the peak of (003) of $\alpha$-phase in the vicinity of 10° to 12° and the peak of (001) of $\beta$-phase in the vicinity of 18° to 20° were confirmed. Further, the nickel hydroxide was subjected to selected area electron diffraction with a TEM (Transmission electron microscope). From the diffraction spot image corresponding to a reciprocal lattice point appearing on a back focal surface, the crystal parameters such as interplanar spacing and plane orientation were calculated. Thus, the crystal phase present in one primary particle was identified. As a result, it has been confirmed that the $\alpha$-phase and the $\beta$-phase were present. That is, it has been confirmed that the $\alpha$-phase and the $\beta$-phase were present in the mixed state within one primary particle of the nickel hydroxide. The $\alpha$-phase nickel hydroxide was oxidized by the charging to be $\gamma$-phase nickel oxyhydroxide. The $\beta$-phase nickel hydroxide was oxidized by the charging to be $\beta$-phase nickel oxyhydroxide.

Results

Figure 1:
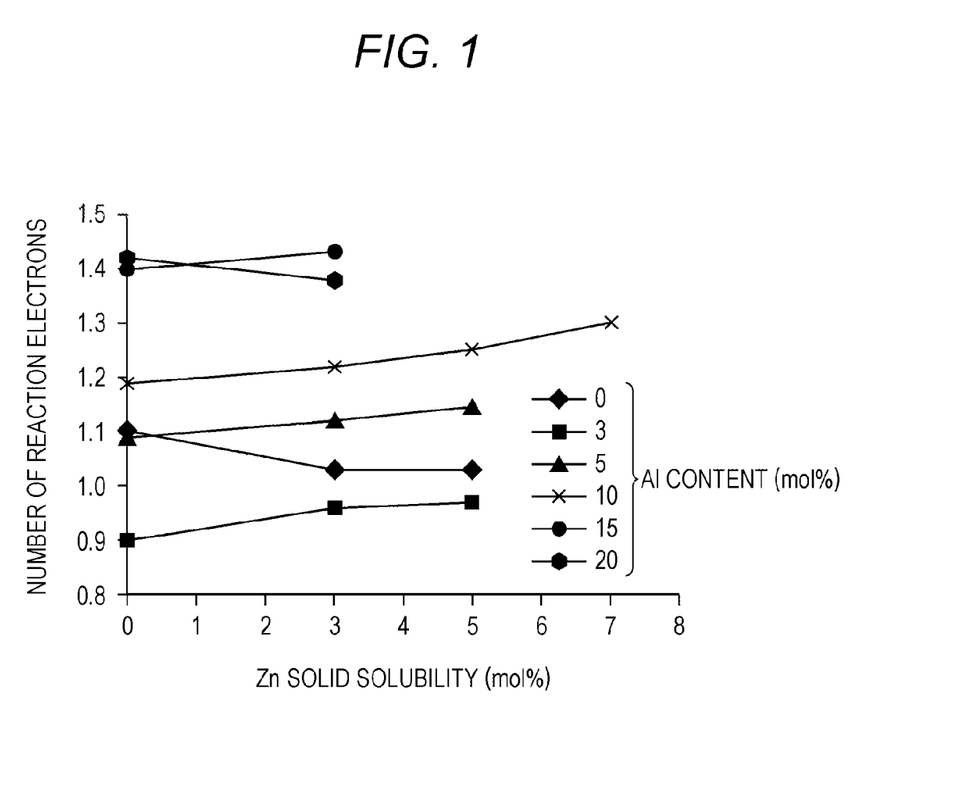
FIG. 1 is a characteristic diagram (graph) illustrating the relationship between the solid solubility of zinc and the number of reaction electrons (there are six different amounts of Al in solid solution: 0, 3, 5, 10, 15 and 20 mol %)
Figure 2:
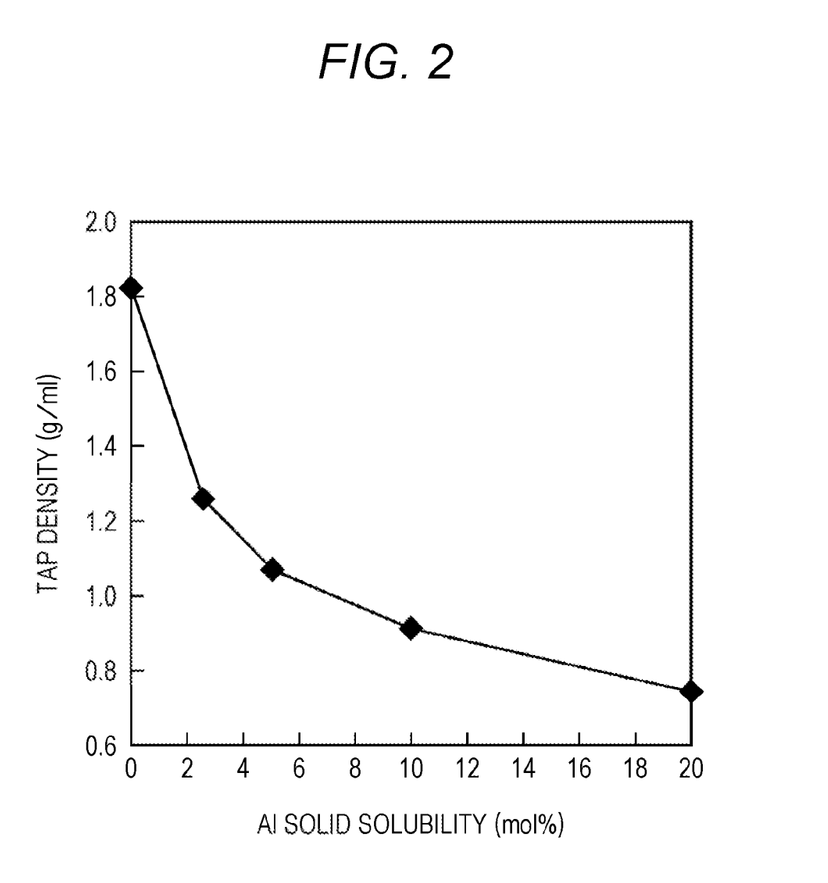
FIG. 2 is a characteristic diagram (graph) illustrating the relationship between the solid solubility of aluminum and the tap density of nickel hydroxide.
Figure 3:
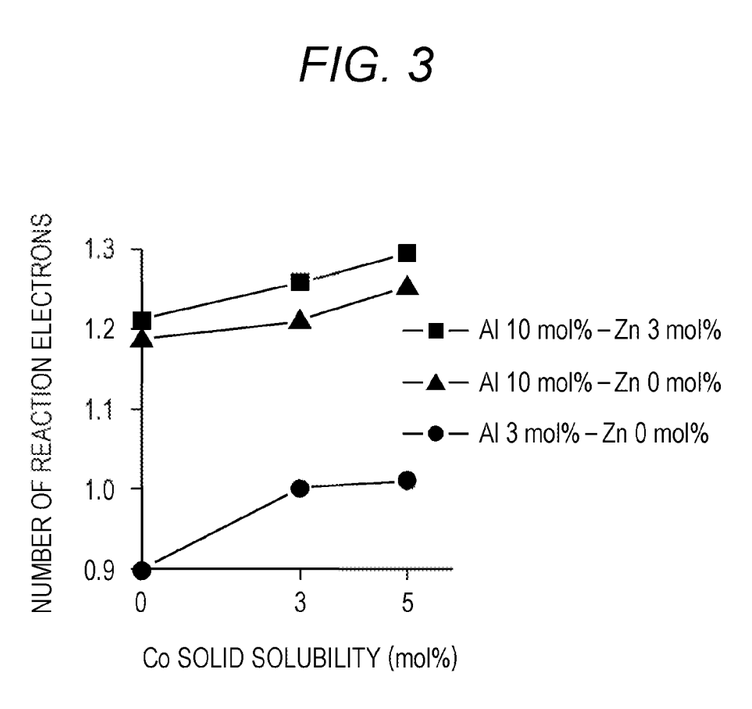
FIG. 3 is a characteristic diagram (graph) illustrating the relationship between the solid solubility of cobalt and the number of reaction electrons (there are three different amounts of Al and Zn in solid solution: Al 10 mol %-Zn 3 mol %, Al 10 mol %-Zn 0 mol %, and Al 3 mol %-Zn 0 mol %).

The results are shown in FIG. 1 to FIG. 3 and in Table 1 to Table 3. FIG. 1 and Table 1 represent the relationship among the solid solubility of aluminum and the solid solubility of zinc (the concentration of Al and Zn in the nickel hydroxide), the number of reaction electrons, and the number of reaction electrons in terms of true density. The number of reaction electrons in terms of true density is obtained by multiplying the number of reaction electrons by the true density of each sample. Here, the true density of each sample in the present application refers to the logical value calculated based on the presence ratio between the $\alpha$-phase and the $\beta$-phase. In other words, in the case where the A element is not held in solid solution in the nickel hydroxide, the $\alpha$-phase is not included in the nickel hydroxide. If the solid solubility of A element in the nickel hydroxide is 20 mol %, the nickel hydroxide is assumed to be present entirely in the $\alpha$-phase. Based on this assumption, the presence ratio of the $\alpha$-phase of the nickel hydroxide is calculated from the solid solubility of A element. Further, using the logical values of the known true densities of the $\alpha$-phase and the $\beta$-phase, the true density of each sample was calculated logically. Note that the positive electrode material (nickel hydroxide) in FIG. 1 and Table 1 has not been subjected to the substitution of Ni for Co. When the solid solubility of aluminum was 0 mol %, Zn decreased the number of reaction electrons. When the solid solubility of aluminum was 3 mol %, Zn increased the number of reaction electrons. However, this number of reaction electrons did not reach the number of reaction electrons which was obtained when the solid solubility of aluminum was 0 mol %. In contrast to this, when the solid solubility of aluminum was 5 mol %, 10 mol %, and 15 mol %, Zn increased the number of reaction electrons. When the solid solubility of aluminum was 20 mol %, Zn decreased the number of reaction electrons. Moreover, when aluminum was held in solid solution in nickel hydroxide, the number of reaction electrons in terms of true density decreased. The decrease in number of reaction electrons in terms of true density means the decrease in discharge capacity of the positive electrode material per unit volume.

TABLE 1

Effect of Al and Zn on the number of reaction electrons

| Sample No. | Solid solubility of Al | Solid solubility of Zn | Number of reaction electrons | Number of reaction electrons in terms of true density |
|---|---|---|---|---|
| Comparative example 1 | 0 | 0 | 1.10 | 4.37 |
| Comparative example 2 | 0 | 3 | 1.03 | 4.09 |
| Comparative example 3 | 0 | 5 | 1.03 | 4.09 |
| Comparative example 4 | 3 | 0 | 0.90 | 3.42 |
| Comparative example 5 | 3 | 3 | 0.96 | 3.65 |
| Comparative example 6 | 3 | 5 | 0.97 | 3.68 |
| Comparative example 7 | 5 | 0 | 1.09 | 4.01 |
| Example 1 | 5 | 3 | 1.12 | 4.12 |
| Example 2 | 5 | 5 | 1.14 | 4.20 |
| Comparative example 8 | 10 | 0 | 1.19 | 4.04 |
| Example 3 | 10 | 3 | 1.22 | 4.14 |
| Example 4 | 10 | 5 | 1.25 | 4.24 |
| Example 5 | 10 | 7 | 1.30 | 4.41 |
| Example 6 | 15 | 3 | 1.43 | 4.44 |
| Comparative example 10 | 20 | 0 | 1.42 | 4.00 |
| Comparative example 11 | 20 | 3 | 1.38 | 3.89 |

*The solid solubility of aluminum and the solid solubility of zinc are represented in the unit of % by [Al]/([Al] + [Zn] + [Ni]) and [Zn]/([Al] + [Zn] + [Ni]) in the positive electrode material.

FIG. 2 and Table 2 represent the relationship between the solid solubility of aluminum and the tap density. In the positive electrode material (nickel hydroxide) in FIG. 2 and Table 2, the Zn element is not held in solid solution. For measuring the tap density, a tap density measurer (RHK type) manufactured by KONISHI MFG CO., LTD. was used. A measuring cylinder of 10 ml content having the sample was dropped from a height of 5 cm for 200 times. After that, the tap density (volume density after the tapping) of the sample was measured. As the solid solubility of aluminum is increased, the tap density of the nickel hydroxide is decreased. The decrease in tap density refers to the decrease in discharge capacity of the positive electrode material per unit volume.

TABLE 2

The solid solubility of aluminum and tap density

| Solid solubility of aluminum (mol %) | Tap density (g/ml) |
|---|---|
| 0 | 1.82 |
| 2.5 | 1.26 |
| 5 | 1.07 |
| 10 | 0.91 |
| 20 | 0.75 |

*The solid solubility of aluminum is represented in the unit of % by [Al]/([Al] + [Ni]) in the positive electrode material.

In the case where the solid solubility of aluminum is in the range around 5 to 15 mol %, the combination of Al and Zn (dissolving Al and Zn in solid solution in the nickel hydroxide) allows the number of reaction electrons to be greater than 1.10 and the number of reaction electrons in terms of true density to be greater than 4.10. In other words, the effects of increasing the number of reaction electrons of the positive active material and increasing the discharge capacity per unit volume of the positive electrode material were obtained. As the solid solubility of aluminum is larger, the tap density of the nickel hydroxide is decreased. This indicates that the solid solubility of aluminum is preferably in the range of 5 to 16 mol %, more preferably 9 to 15 mol %, and particularly preferably 9 to 12 mol %. If the solid solubility of aluminum is in the range around 5 to 15 mol %, dissolving Zn in the nickel hydroxide is effective whichever the solid solubility is 3 mol %, 5 mol %, or 7 mol %. The number of reaction electrons increases approximately linearly relative to the solid solubility of zinc. Dissolving excessive Zn in solid solution in the nickel hydroxide leads to the decrease in presence ratio of Ni contained in the nickel hydroxide. Therefore, the solid solubility of zinc may be, for example, 1 to 10 mol %, and is preferably 2 to 8 mol % as described in Example and its periphery, and particularly preferably 3 to 7 mol % as described in Example.

The results of measuring the charging curves proved that the substitution of nickel atom for Zn increased the oxygen generation potential. The examination of this along with the change in number of reaction electrons due to Zn leads the following fact: Zn increases the oxygen generation potential. As a result, the charging current can be effectively used for oxidizing Ni. Thus, the number of reaction electrons is increased. Further, if the solid solubility of aluminum is 0, Zn does not contribute to an increase in number of reaction electrons substantially. Even if the solid solubility of aluminum is 20 mol %, Zn does not contribute to an increase in number of reaction electrons substantially.

FIG. 3 and Table 3 represent the effect of the solid solubility of cobalt which is precipitated at the same time as the nickel hydroxide. This Co is different from the $Co(OH)_2$ mixed after the coprecipitation of the nickel hydroxide. By further dissolving Zn and Co in solid solution in the nickel hydroxide in which 10 mol % of Al has been held in solid solution, the number of reaction electrons is increased. Co provides its effects when the concentration thereof is either 3 mol % or 5 mol %. Therefore, if the solid solubility of cobalt in the nickel hydroxide is 2 to 6 mol %, the sold solubility of zinc may be, for example, 1 to 10 mol %, and is preferably 2 to 8 mol % and particularly preferably 3 to 7 mol %. The solid solubility of aluminum may be, for example, 5 to 16 mol %, and is preferably 9 to 15 mol % and particularly preferably 9 to 12 mol %. In the measurement of the charging curve, the substitution of Ni for Co did not lead to the increase in the oxygen generation potential. Thus, it is assumed that by decreasing the Ni oxidation potential, Co promotes the oxidation of Ni rather than the generation of oxygen.

TABLE 3

Effect of Al, Zn, and Co on the number of reaction electrons

| Sample No. | Solid solubility of Al | Solid solubility of Zn | Solid solubility of Co | Number of reaction electrons | Number of reaction electrons in terms of true density |
|---|---|---|---|---|---|
| Comparative example 11 | 10 | 0 | 3 | 1.21 | 4.11 |
| Example 7 | 10 | 3 | 3 | 1.26 | 4.28 |
| Example 8 | 10 | 3 | 5 | 1.29 | 4.38 |
| Comparative example 12 | 3 | 0 | 3 | 1.00 | 3.80 |

TABLE 3-continued

Effect of Al, Zn, and Co on the number of reaction electrons

| Sample No. | Solid solubility of Al | Solid solubility of Zn | Solid solubility of Co | Number of reaction electrons | Number of reaction electrons in terms of true density |
|---|---|---|---|---|---|
| Comparative example 13 | 3 | 0 | 5 | 1.01 | 3.84 |

*The solid solubility of Al, Zn, and Co is represented in the unit of mol % assuming that the total concentration of Al, Zn, Co, and Ni in the positive electrode material is 100 mol %.

In Example, the aluminum atom is held in solid solution in the nickel hydroxide. Thus, α-Ni(OH)$_2$ can be stabilized and α-Ni(OH)$_2$ and β-Ni(OH)$_2$ can be present in the mixed state. Similarly, it is known that α-Ni(OH)$_2$ and β-Ni(OH)$_2$ can be stably present in the mixed state in any of the nickel hydroxide incorporating Mn in solid solution, the nickel hydroxide incorporating Ga in solid solution, or the nickel hydroxide incorporating Mo in solid solution. Therefore, the nickel hydroxide in which the aluminum atom is held in solid solution may be replaced by the nickel hydroxide in which the Mn atom is held in solid solution, the nickel hydroxide in which the Ga atom is held in solid solution, or the nickel hydroxide in which the Mo atom is held in solid solution. The total concentration of the Al, Mn, Ga, and Mo elements is preferably 5 to 16 mol % relative to the total amount of the Ni element and these elements.

Instead of the coprecipitation of Zn together with the nickel hydroxide, the ZnO micropowder was mixed with the nickel hydroxide (nickel hydroxide in which the Al atom is held in solid solution in the crystallite) after the precipitation. Further, the Zn(OH)$_2$ was dissolved in the electrolyte solution and the number of reaction electrons was measured. The results indicated that the number of reaction electrons did not increase. This indicates that the number of reaction electrons increases when the Zn atom is taken in the particle of the nickel hydroxide and at least a part of the Zn atoms is held in solid solution in the nickel hydroxide.

The oxygen generation potential at the positive electrode is increased when the NaOH aqueous solution, the aqueous solution of a mixture of NaOH and KOH, the aqueous solution of a mixture of LiOH and KOH, or the like is employed as the electrolyte solution instead of the KOH aqueous solution. The most preferable electrolyte solution is the NaOH aqueous solution and the aqueous solution of the mixture of LiOH and KOH.

Examples have proved the following facts.
1) The number of reaction electrons is increased when Al and Zn are held in solid solution in the crystallite of the nickel hydroxide.
2) The number of reaction electrons is not increased even though Zn is held in solid solution in the nickel hydroxide in which Al is not held in solid solution.
3) The number of reaction electrons is not increased even though Zn is held in solid solution in the nickel hydroxide in which 20 mol % of Al is held in solid solution.
4) In consideration of the decrease in tap density of the nickel hydroxide due to the increase in solid solubility of aluminum and the relationship between the solid solubility of aluminum and the number of reaction electrons, the optimal value of the solid solubility of aluminum is approximately 10 mol %.
5) The number of reaction electrons is linearly increased relative to the solid solubility of zinc.
6) Zn is preferably held in solid solution in the crystallite of the nickel hydroxide. The number of reaction electrons was not increased even when the Zn(OH)$_2$ particle was attached to the surface of the nickel hydroxide particle. Further, even though the Zn$^{2+}$ ions are contained in the electrolyte solution, the number of reaction electrons was not increased.
7) When Co is contained in the nickel hydroxide particle, the number of reaction electrons is increased.

The embodiment of the present invention may be the following first and second positive electrodes for an alkaline storage battery, the following first alkaline storage battery, and the following first method for manufacturing the positive electrode material for the alkaline storage battery.

The first positive electrode material for an alkaline storage battery contains the nickel hydroxide in which: Zn and the A element, as at least one element selected from the group consisting of Al, Ga, Mn, and Mo, are dissolved in the crystallite; the content of the A element, [A]/([Ni]+[A]+[Zn]), is 5 to 16%; [Zn]/([Ni]+[A]+[Zn]) is 1 to 10%; and α-phase and β-phase are present in the mixed state. Note that [A] represents the molarity of the A element (such as aluminum), [Ni] represents the molarity of nickel, and [Zn] represents the molarity of zinc.

The second positive electrode material for an alkaline storage battery is the first positive electrode material for an alkaline storage battery, in which Co is further held in solid solution in the crystallite of the nickel hydroxide.

The first alkaline storage battery includes: a positive electrode containing the first or second positive electrode material for the alkaline storage battery; a negative electrode; and an alkaline electrolyte solution.

The first method for manufacturing the positive electrode material for the alkaline storage battery includes: the reaction between an alkaline aqueous solution and an aqueous solution containing Ni$^{2+}$ ion, Zn$^{2+}$ ion, and at least one ion selected from the group consisting of Al$^{3+}$, Ga$^{3+}$, Mn$^{2+}$, and Mo$^{6+}$; the coprecipitation of the Ni$^{2+}$ ion, the Zn$^{2+}$ ion, and the at least one ion selected from the group consisting of Al$^{3+}$, Ga$^{3+}$, Mn$^{2+}$, and Mo$^{6+}$; and the dissolving of at least one element selected from the group consisting of Al, Ga, Mn, and Mo and Zn in solid solution in the crystallite of the nickel hydroxide.

What is claimed is:
1. A positive electrode material for an alkaline storage battery, comprising nickel hydroxide, wherein:
Zn and Al are held in solid solution in a crystallite of the nickel hydroxide;
the content of the Al, [A]/([Ni]+[A]+[Zn]), is 5 to 16% (where [A] represents the molarity of Al, [Ni] represents the molarity of nickel, and [Zn] represents the molarity of zinc in the crystallite);
[Zn]/([Ni]+[A]+[Zn]) is 1 to 10%; and
the nickel hydroxide includes α-phase nickel hydroxide and β-phase nickel hydroxide.
2. The positive electrode material for an alkaline storage battery according to claim 1, wherein Co is further held in solid solution in the crystallite of the nickel hydroxide.
3. An alkaline storage battery comprising:
a positive electrode containing the positive electrode material for the alkaline storage battery according to claim 1;
a negative electrode; and
an alkaline electrolyte solution.
4. A method for manufacturing the positive electrode material for an alkaline storage battery of claim 1, comprising:

a reaction between an alkaline aqueous solution and an aqueous solution containing $Ni^{2+}$ ion, $Zn^{2+}$ ion, and $Al^{3+}$ ion;

coprecipitation of the $Ni^{2+}$ ion, the $Zn^{2+}$ ion, and the $Al^{3+}$ ion; and preparing Al and Zn in solid solution in a crystallite of nickel hydroxide.

5. The positive electrode material for an alkaline storage battery according to claim 1, wherein [Zn]/([Ni]+[A]+[Zn]) is 5 to 10%.

* * * * *